United States Patent [19]
Yamazaki et al.

[11] Patent Number: 5,289,300
[45] Date of Patent: Feb. 22, 1994

[54] METHOD OF MANUFACTURING ELECTRO-OPTICAL DEVICES WHEREIN THE ELECTRODE IS PATTERNED ON THE MODULATION LAYER

[75] Inventors: Shunpei Yamazaki, Tokyo; Akira Mase, Aichi; Toshiji Hamatani; Takeshi Nishi, both of Kanagawa, all of Japan

[73] Assignee: Semiconductor Energy Laboratory Co., Ltd., Kanagawa, Japan

[21] Appl. No.: 829,263

[22] Filed: Feb. 3, 1992

[30] Foreign Application Priority Data

Feb. 4, 1991 [JP] Japan .................................. 3-035483
Feb. 6, 1991 [JP] Japan .................................. 3-036680

[51] Int. Cl.⁵ ...................... G02F 1/13; G02F 1/1343
[52] U.S. Cl. ........................................ 359/51; 359/58; 359/59; 359/87
[58] Field of Search ................ 359/51, 52, 53, 54, 359/59, 87, 58

[56] References Cited

U.S. PATENT DOCUMENTS

| | | | |
|---|---|---|---|
| 4,688,900 | 8/1987 | Doane et al. | 359/52 |
| 4,697,331 | 10/1987 | Boulitvop et al. | 359/59 |
| 4,834,509 | 5/1989 | Gunjima et al. | 359/52 |
| 4,961,630 | 10/1990 | Baron et al. | 359/54 |
| 5,015,074 | 5/1991 | Clerc et al. | 359/53 |
| 5,022,750 | 6/1991 | Flasck | 359/51 |
| 5,128,785 | 7/1992 | Yoshimoto et al. | 359/58 |
| 5,136,404 | 8/1992 | Nobile et al. | 359/52 |
| 5,150,232 | 9/1992 | Gunkima et al. | 359/51 |
| 5,151,802 | 9/1992 | Coutuvier | 359/84 |
| 5,168,380 | 12/1992 | Fergason | 359/52 |
| 5,208,686 | 5/1993 | Fergason | 359/98 |

FOREIGN PATENT DOCUMENTS

| | | | |
|---|---|---|---|
| 62-28712 | 2/1987 | Japan | 359/51 |
| 3-166515 | 7/1991 | Japan | 359/51 |

*Primary Examiner*—William L. Sikes
*Assistant Examiner*—Ron Trice
*Attorney, Agent, or Firm*—Sixbey, Friedman, Leedom & Ferguson

[57] ABSTRACT

A method of manufacturing electro-optical devices is described. The method comprises steps of forming a first electrode arrangement on a substrate, coating an electro-optical modulating layer comprising a liquid crystal on the substrate over the first electrode arrangement and forming a second electrode arrangement on the electro-optical modulating layer. The electro-optical modulating layer is prepared by dispersing a liquid crystal in a pre-polymer which can be cured by UV light or other suitable procedures.

29 Claims, 10 Drawing Sheets 204  203  202  201

METHOD OF MANUFACTURING ELECTRO-OPTICAL DEVICES WHEREIN THE ELECTRODE IS PATTERNED ON THE MODULATION LAYER

BACKGROUND OF THE INVENTION

1. Field of the Invention

The present invention relates to a method of manufacturing electro-optical devices and, more particularly to a method of manufacturing electro-optical liquid crystal devices of light-weight thin panel type.

2. Description of the Prior Art

There have been well known in the art several liquid crystal displays utilizing super-twisted nematic liquid crystals or twisted nematic liquid crystals cooperative with thin film transistors for use in microcomputers, wordprocessors and the like. Other liquid crystal devices include ferroelectric liquid crystal displays proposed recently. These conventional devices comprise a liquid crystal material disposed and supported between a pair of substrates. The inner surfaces of the substrates are provided with electrode arrangements in order to define a plurality of pixels. The optical property of the liquid crystal material corresponding to a respective pixel is modulated by selectively applying an electric field to rearrange the liquid crystal molecules having an anisotropical dielectric.

In the case of a twisted nematic liquid crystal device as schematically illustrated in FIG. 1, a first substrate 201 is provided with a first electrode arrangement 202 made of indium tin oxide. The inner surface of the substrate 201 is coated with polyimide film 203 over the first electrode arrangement 202. An orientation control surface is formed by rubbing the polyimide film 203. A second substrate is prepared in the same manner. The first and second substrates are joined in order that the rubbing directions are perpendicular to each other. When a twisted nematic liquid crystal material is disposed between the first and second substrates, the liquid crystal molecules are aligned parallel to the rubbing directions at the both surfaces of the substrates so that a helix is formed between the substrates with a minimal energy condition of the liquid crystal molecules.

Such conventional liquid crystal devices require polarizing plates for optical operation and the liquid crystal molecules have to be arranged in a prescribed orientation in order to utilize a desired optical anisotropy.

On the other hand, there have been also well known in the art other type liquid crystal displays utilizing dispersion of liquid crystal materials. A nematic, cholesteric or smectic liquid crystal material is dispersed in and supported by a solid state transparent polymer, e.g. in the form of granules as supported in a sponge-like structure. Namely, a liquid crystal material is encapsulated in a polymer by dispersion and laminated on a substrate in the form of a thin film. Examples of such polymers include gelatin, gum arabic or polyvinyl alcohol.

The polymer and the liquid crystal material are selected to have an equal dielectric anisotropy when the liquid crystal molecules are aligned in a certain direction by virtue of an electric field applied thereto. By this structure, the thin film becomes transparent when such an electric field is applied and becomes opaque when the electric field is removed since the liquid crystal molecules are oriented to various directions so that incident light is scattered. Other examples of this type displays are such utilizing liquid crystal capsules dispersed in an epoxy resin, phase separation between a liquid crystal material and a photo-curing resin and a three-dimmensionally chained polymer impregnated with a suitable liquid crystal material. In this description of the present invention, such encapsulated liquid crystals are called dispersion-type liquid crystals in general.

There is, however, a need for such liquid crystal displays to manufacture large display panels at low costs without complicated processes. One of large problems of manufacturing large panels is difficulty in charging a liquid crystal material between a pair of substrates in order to align the liquid crystal molecules. FIG. 2 illustrates a prior art technique of charging a liquid crystal material into a narrow space formed between a pair of substrates. After liquid crystal display 301 is placed in a vacuum chamber, the vacuum chamber is evacuated by a vacuum pump to remove air from the inner space of the display. An inlet port 302 of the liquid crystal display is then immersed in a liquid crystal material 303 contained in a reservoir in the vacuum chamber. The liquid crystal material enters the inner space by a differential pressure by leaking nitrogen into the vacuum chamber to elevate the pressure of the chamber.

In the case of A4 panels, the distance between the inlet port 302 and the end of the inner space reaches 200 mm or longer. The distance of the substrates, i.e. the thickness of the space does usually not exceed 20 micrometers. The liquid crystal material have therefore to travel such a narrow space for 200 mm or longer distance so that the charging time becomes very long.

Also, the liquid crystal display becomes eventually expensive due to an expensive manufacturing system including an evacuation device. Furthermore, the liquid crystal material is prepared by blending a number of liquid crystals having different transition temperatures and vapor pressures so that the optical characteristic of the liquid crystal material may possibly be modified because composition of the blend is changed by partial evaporation of a constituent liquid crystal having a high vapor pressure due to exposure to vacuum. Still further, the weight of the display per unit area is increased as the size of the display increases since the thickness of the substrate must be increased in order to maintain the distance between the substrates at a constant level. This contradicts the general current demands for small and light weight devices.

BRIEF SUMMARY OF THE INVENTION

It is an object of the present invention to provide a method of manufacturing electro-optical devices at a low cost.

It is another object of the present invention to provide a method of manufacturing electro-optical devices having stable optical characteristics.

It is a further object of the present invention to provide a method of manufacturing electro-optical devices of a light weight thin panel type.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, an electro-optical device is manufactured by forming a first electrode arrangement on a substrate, coating an electro-optical modulating layer comprising a liquid crystal on the substrate over the first electrode arrangement and forming a second electrode arrangement on the electro-optical modulating layer. The electro-optical modulating layer comprises a transparent solid material in which a liquid crystal is supported in the form of particles or sponge. Examples of the liquid crystals include nematic liquid crystals, cholesteric liquid crystals and smectic liquid crystals. The transparent solid materials are, for example, transparent solid polymers or monomers which can be polymerized. Examples of the transparent solid polymers include polyethylene, polymethacrylic acid ester, polystyrene, polyvinylchloride, polyacrylonitrile, polyvinylalcohol, polyester, polyamide resins, polyethylene terephthalate, fluorine contained resins, silicon resins and mixture thereof and so forth.

In typical examples, a polymerizable monomer or a solid polymer and a liquid crystal are dissolved in a common solvent. In the case of a polymerizable monomer, the solution is coated on a substrate and given thermal treatment or irradiation to initiate polymerization to form an electro-optical modulating layer. In the case of a solid polymer, the solution is coated on a substrate as a liquid film followed by removal of the solvent. Examples of the solvent are water and unsaturated hydrocarbons such as ketones, alcohols, benzene, toluenes. These examples can be used alone or a mixture depending upon the method of coating.

The electro-optical modulating layer is coated on the substrate by screen press printing, offset printing, spinning, spraying, knife coating using a doctor knife, roll coating, curtain coating or other suitable methods. The thickness of the electro-optical modulating layer is, for example, no larger than 20 micrometers.

In the case of a liquid crystal display having a plurality of pixels in a matrix form, each pixel of the display is provided with a switching element of complementary thin film field effect transistors which forcibly pull or push the level of the liquid crystal layer to a definite high or low voltage level rather than a floating state. The thin film transistors are formed on the substrate by suitable deposition techniques. Although in the embodiment as described infra the complementary transistors are designed as an invertor, the transistors can be connected to form a buffer in the same manner.

Also, the switching element can be comprised of an N-channel thin film transistor. The N-channel transistor is connected between a driving signal line and each electrode pad defining to each pixel. The gate terminal of the transistor is connected to another driving signal line in order to address the pixel.

In accordance with the present invention, an electro-optical device can be formed on a single substrate with no counterpart substrate and no polarizing plate by simple procedures without a vacuum system so that the manufacturing cost is reduced; the yield of production is increased; and the brightness is improved.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
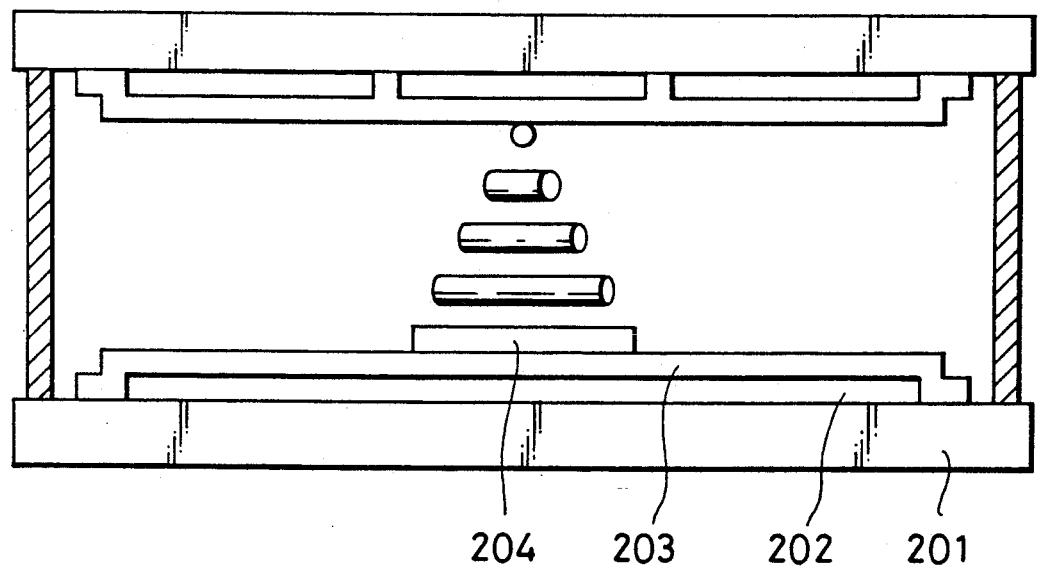
FIG. 1 is a cross sectional schematic view showing a general configuration of a prior art liquid crystal display.
Figure 2A:
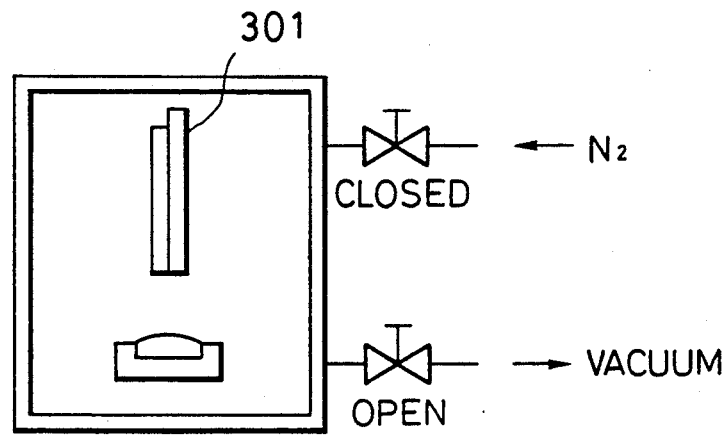
FIGS. 2(A) to 2(C) are schematic diagrams demonstrating a prior art method of charging a liquid crystal into a liquid crystal device.
Figure 2B:
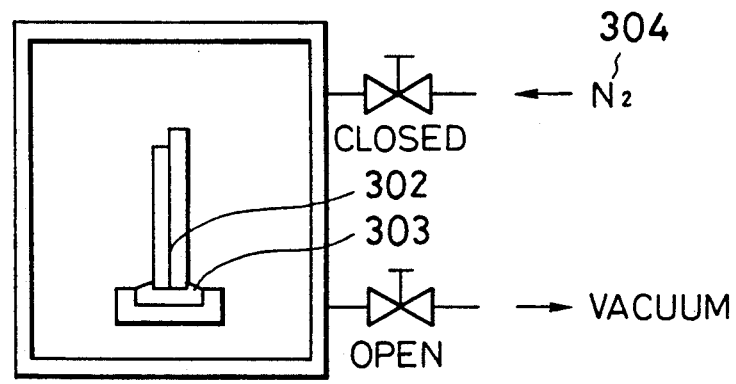
Figure 2C:
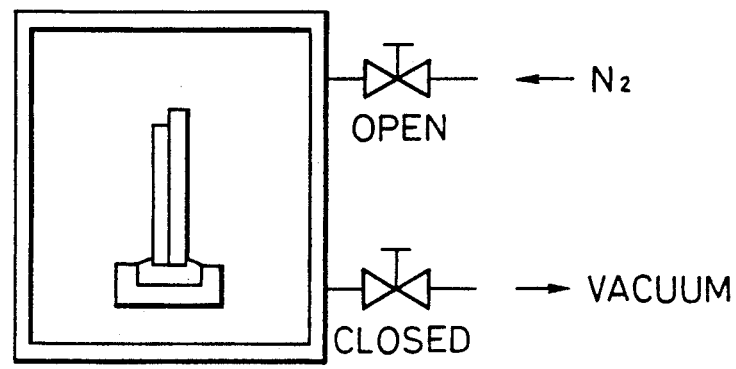
Figure 3A:
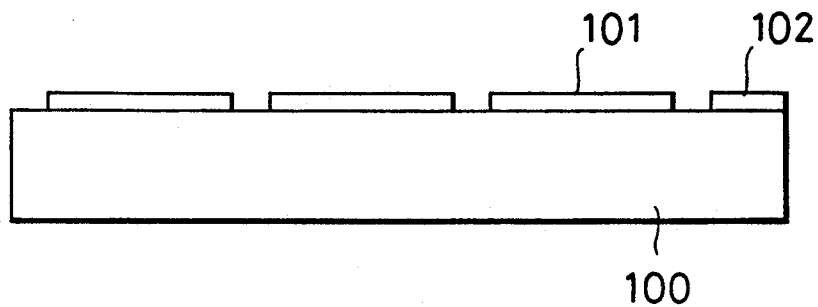
FIGS. 3(A) to 3(C) are cross sectional views showing a method of manufacturing an electro-optical device in accordance with a first embodiments of the present invention.
Figure 3B:
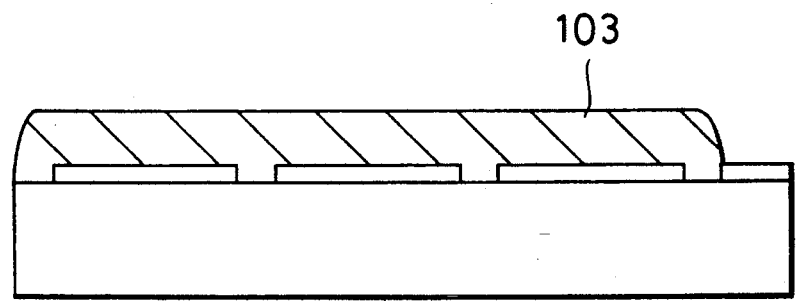
Figure 3C:
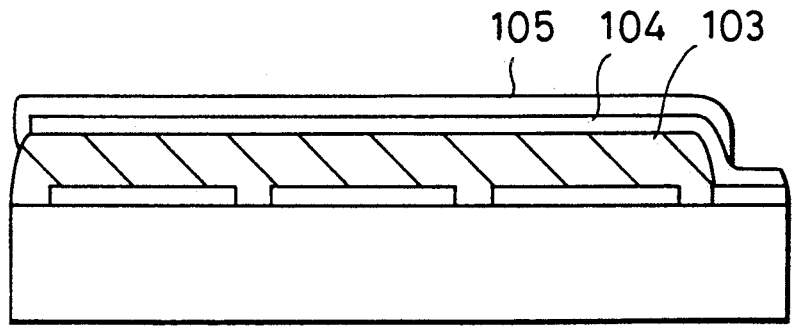

Referring now to FIGS. 3(A) to 3(C), a method of manufacturing an electro-optical device in accordance with a first embodiment of the present invention will be described in details. Numeral 100 designates a transparent substrate on which a liquid crystal display device is formed. The substrate is made of a soda-lime glass. An ITO (indium tin oxide) film is sputtered to a thickness of 100 angstroms on the substrate 100 and patterned by etching to form a first electrode arrangement 101 as shown in FIG. 3(A). The first electrode arrangement 101 comprises a number of parallel strips extending in the direction normal to the plane of the drawing sheet. At the same time as the first electrode arrangement is formed, contact pads 102 are formed to provide suitable terminals for a second electrode arrangement, which will be formed in a later step. If the contact pads are made of a metal, the resistance of the terminals of the second electrode arrangement can be decreased.

On the other hand, a dispersion-type liquid crystal material is prepared by mixing a nematic liquid crystal with a pre-polymer and a suitable polymerization initiator. The pre-polymer is, for example, trimethylol propane triacrylete. The proportion of the pre-polymer in the mixture is about 25%. The mixture is coated on the substrate 100 over the electrode arrangement 101 to a thickness of 15 micrometers by screen press printing. After sufficiently leveling the coating by still leaving it for a while, the pre-polymer of the mixture is hardened by polymerization by exposing the entirety of the coating to ultraviolet light. An electro-optical modulating layer 103 is then formed to a thickness of 25 micrometers as shown in FIG. 3(B). In the electro-optical modulating layer, the liquid crystal is encapsulated in the form of granules having a diameter of 0.2 to 3 $\mu$m.

The upper surface of the layer 103 is coated again with an ITO film by sputtering and subjected to selective etching in order to leave a second electrode arrangement in the same manner as the first electrode arrangement. The second electrode arrangement comprises parallel strips extending in the orthogonal relationship to the first electrode arrangement 101. The electro-optical modulating layer 103 must not be damaged during the formation of the second electrode arrangement 104. For this purpose, the sputtering of the ITO film is carried out in an atmosphere whose oxygen density is lowered and at a temperature lower than temperatures employed in usual sputtering. The patterning of the second electrode arrangement is carried out by providing a photoresist mask on the ITO film and etching the ITO film with an etchant gas including carbon tetrachloride. If the wet etching is employed instead, the electro-optical modulating layer has to be made from materials having sufficient resistance to the etchant acid. After the patterning, the second electrode arrangement 104 is oxidized by heating it at 250° C. in an oxidizing atmosphere in order to improve the transparency and the conductivity of the second electrode arrangement. The entire surface of the structure is coated with a transparent protective film 105 made of a silicon resin by a coating method.

Figure 4:
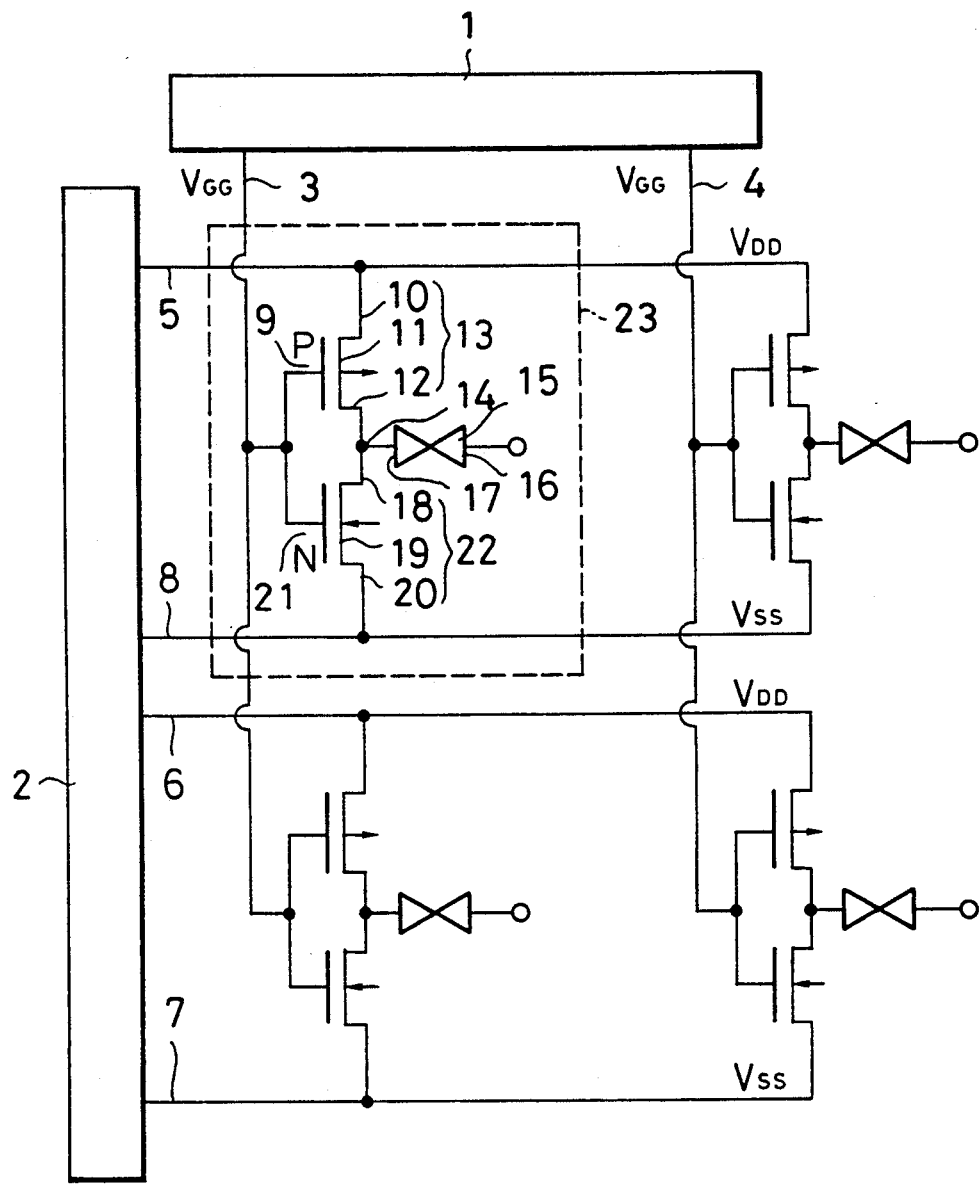
FIG. 4 is a schematic diagram showing an equivalent circuit of an electro-optical device manufactured in accordance with a second embodiment of the present invention.
Figure 5:
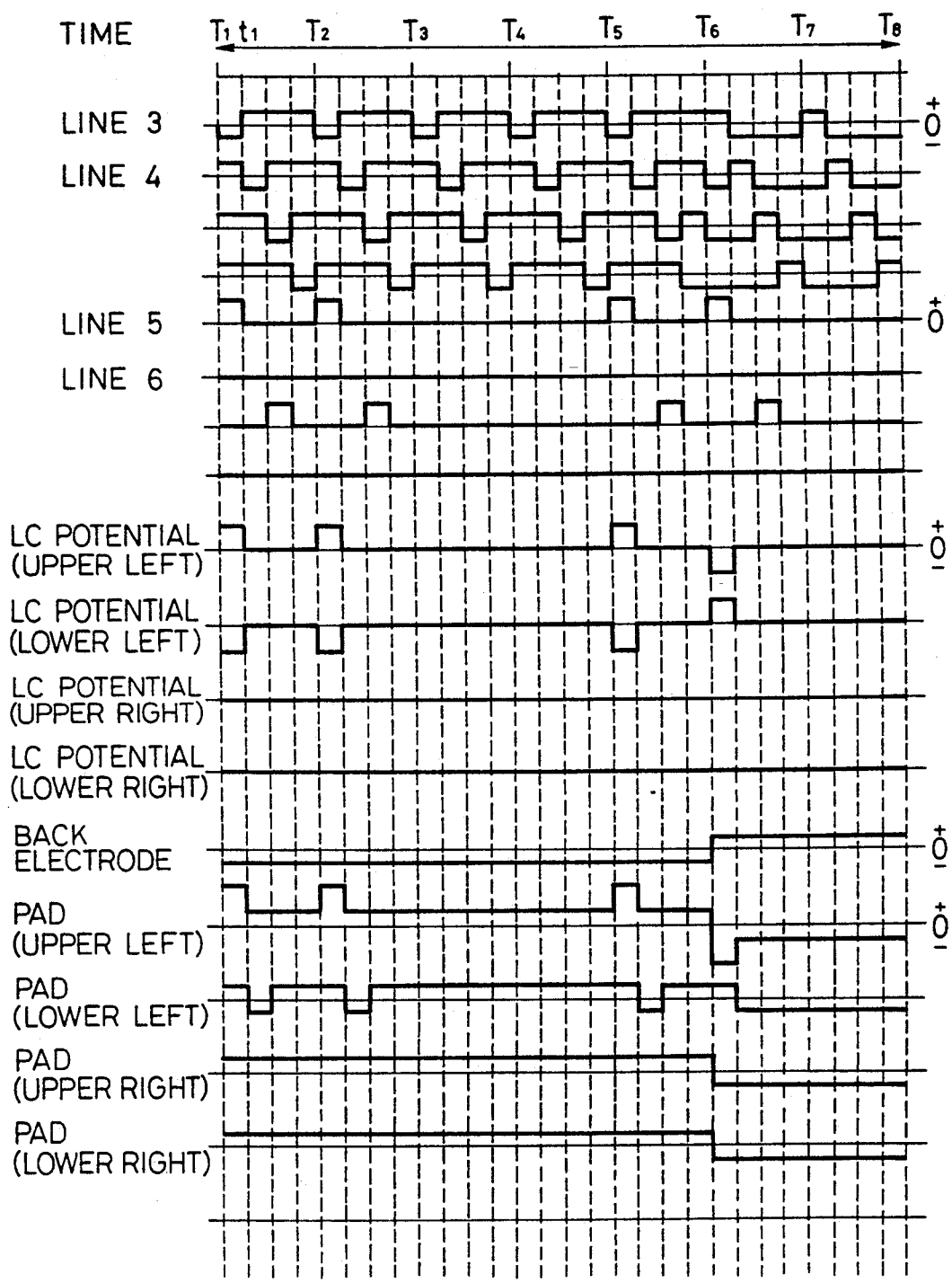
FIG. 5 is an explanatory diagram showing the timing of operation of the electro-optical device.

FIG. 4 is a diagram illustrating the equivalent circuit of a liquid crystal display manufactured in accordance with a second embodiment of the present invention. The diagram shows only a 2×2 matrix for the sake of convenience in description whereas ordinary liquid crystal displays consist of more great numbers of pixels such as a 640×480 matrix, a 1260×960 matrix. The liquid crystal display panel includes an electro-optical modulating layer 15. The electro-optical modulating layer 15 is disposed between a common back electrode 16 and a plurality of conductive pads 17 each defining one pixel of the display. Each conductive pad is formed on a quartz substrate together with CMOS transistors consisting of an n-channel thin film transistor 22 and a p-channel thin film transistor 13 whose drains 12 and 18 are electrically connected with the corresponding conductive pad. The sources of the p-channel transistors of the CMOSs on a similar row are connected with a $V_{DD}$ line 5 (6) of the row. The sources of the n-channel transistors of the CMOSs on a similar row are connected with a Vss line 8(7). The gates of the p-channel and n-channel transistors of the CMOSs on a similar column are connected with a $V_{GG}$ line 3(4) of the column. The lines 5 to 8 are connected with a row driver 2 and supplied with data signals therefrom. The $V_{GG}$ lines 3 and 4 are connected with a column driver 1 and supplied with control signal therefrom. FIG. 5 is an exemplary timing chart of control signals and data signals for driving the liquid crystal.

The operation of the complementary transistors will be explained. When a control signal of a low level (OV) is supplied to the gates through the $V_{GG}$ line 3, the p-channel transistor 13 is turned on while the n-channel transistor 22 is turned off. The output terminal of the complementary transistors, i.e. the drain terminals 12 and 18 connected to the conductive pad 18, is relieved of the Vss line 8 and connected to the $V_{DD}$ line and therefore pulled up to a high voltage $V_{DD}$ (e.g. +7 V) when an input signal of the high voltage is applied to the $V_{DD}$ line 5. On the contrary, when a control signal of a high level (5 V) is supplied to the gates, the p-channel transistor 13 is turned off while the n-channel transistor 22 is turned on. The output terminal of the complementary transistors is relieved of the $V_{DD}$ line and connected to the Vss line and therefore pushed down to a low voltage (e.g. 0 V or −7 V) when an input signal of the low voltage is applied to the Vss line. In the operation of the display, the column driver 1 supplies control signals of the low level to selected columns to connect the $V_{DD}$ line with the pads on the columns and disconnect the Vss line from the pads on the columns. On the other hand, the row driver 2 supplies data signals of the high level to a selected row(s) by means of the $V_{DD}$ line to pull up the desired pads located on the selected column(s) and the selected row(s) at the same time. Namely, in the operation, the liquid crystal layer is selectively subjected to three voltage levels, i.e. −7 V, 0 V or +7 V at the respective pixels to form an arbitrary visual pattern.

Figure 6:
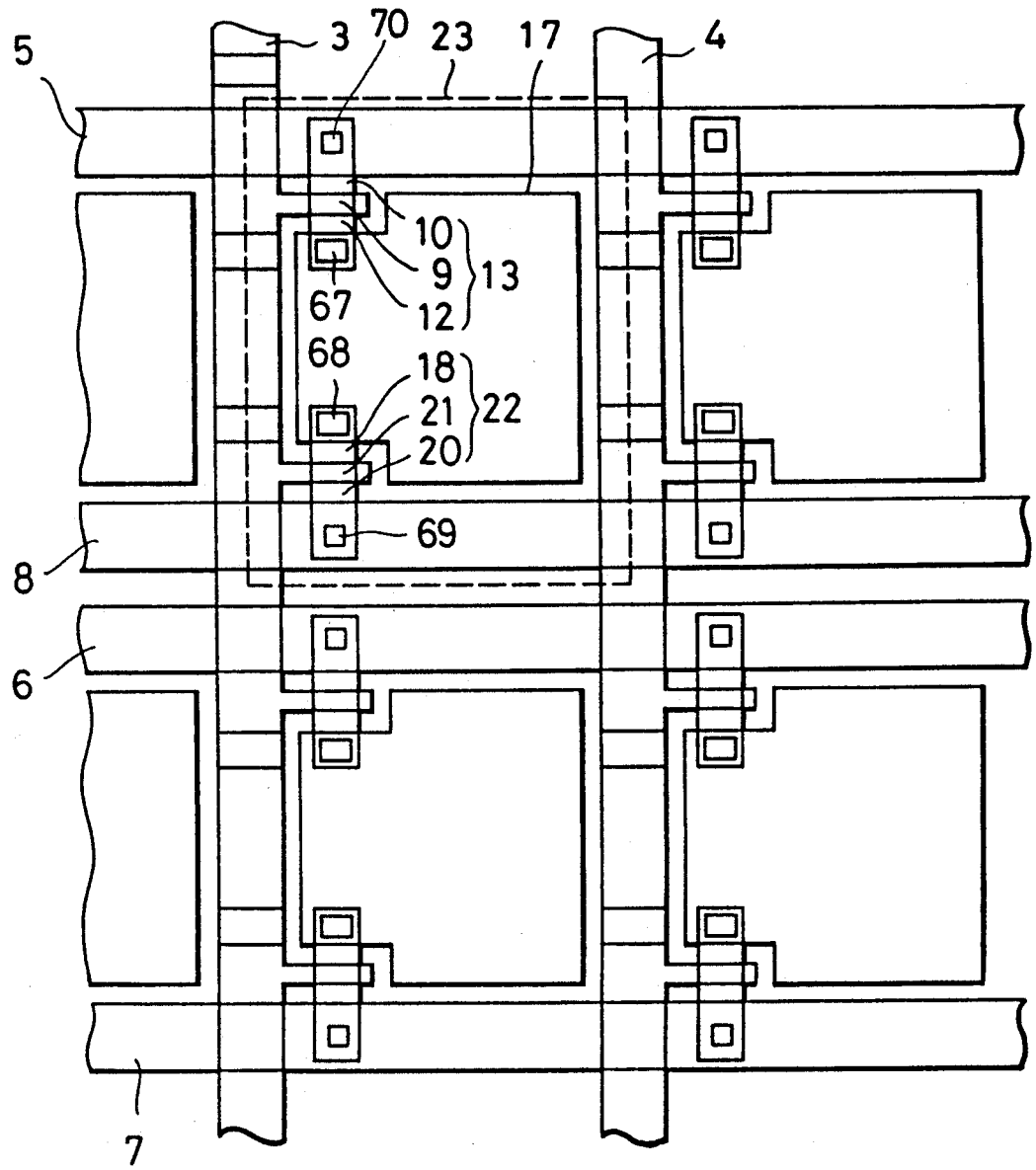
FIG. 6 is a plan view showing the electro-optical device illustrated in FIG. 4.

FIG. 6 is a plan view of the liquid crystal display panel illustrated in FIG. 4 showing the geometrical configuration of the circuitry fabricated on the glass substrate. The similar elements are given similar numerals so that redundant explanation will be dispensed with. One pixel 23 is enclosed by broken line in which a conductive pad 17 is connected with the source 12 of the p-channel transistor 13 through a contact 67 and the source 18 of the n-channel transistor 22 through a contact 68. The drain 20 of the n-channel transistor 22 is connected with the Vss line 8 through a contact 69. The drain 10 of the p-channel transistor 13 is connected with the $V_{DD}$ line 5 through a contact 70. By repeating the structure in the column and row directions, a large area display can be constructed in a matrix of 640×480 pixels or 1280×960 pixels.

Referring now to FIGS. 7(A) to 7(F), a method of manufacturing the thin film field effect transistors 13 and 22 in accordance with the second embodiment of the invention will be described in details.

A glass substrate 50 is made from an inexpensive glass which can endure thermal treatment at high temperatures up to 700° C., e.g. about, 600° C. such as quartz glass. A $SiO_2$ film 51 is deposited on the substrate 50 in a magnetron sputtering apparatus as a blocking film to a thickness of 1000 angstroms to 3000 angstroms in a 100% $O_2$ atmosphere (0.5 Pa) at a substrate temperature of 15° C. The output power of the apparatus is 400 W to 800 W in terms of 13.56 MHz RF energy. A single crystalline silicon or a quartz block is used as a target. The deposition speed is 30 to 100 angstroms/min.

An amorphous silicon film 52 is next deposited in the sputtering apparatus on the $SiO_2$ film 51 to a thickness of 200 to 5000 angstroms, e.g. 1500 angstroms. The total density of oxygen in the amorphous film does not exceed $5 \times 10^{21}$ cm$^{-3}$, typically no higher than $7 \times 10^{19}$ cm$^{-3}$, preferably no higher than $1 \times 10^{19}$ cm$^{-3}$. Such low density makes it easy to recrystallize the source and the drain to be formed in the silicon film in the latter step by thermal treatment at a low temperature only within a relatively short time. If the density of oxygen is too low, however, current leakage in an off condition is increased when a back light is employed for illuminating the display. For this reason, the density is selected between $4 \times 10^{19}$ cm$^{-3}$ and $4 \times 10^{21}$ cm$^{-3}$. In accordance with experiments, the density of hydrogen was measured to be $4 \times 10^{20}$ cm$^{-3}$ equivalent to one atom % assuming that the density of silicon was $4 \times 10^{22}$ cm$^{-3}$. The atmosphere in the sputtering apparatus comprises a mixture consisting of hydrogen and argon so that $H_2/(H_2+Ar)=0.2$ to 0.8 in terms of partial pressure, e.g. argon at 20% and hydrogen at 80%. The hydrogen and argon gases have desirably purities of 99.999% and 99.99% respectively and are introduced after the inside of the apparatus is evacuated to a pressure not higher than $1\times 10^{-5}$ Pa. The total pressure is 0.5 Pa: the output power of the apparatus is 400 W to 800 W of 13.56 MHz RF energy: a single crystalline silicon desirably containing oxygen atoms at a concentration of no higher than $5\times 10^8$ cm$^{-3}$, e.g. $1\times 10^8$ cm$^{-3}$ is used as a target: and the substrate temperature is maintained at 15° C. (deposition temperature). The deposition speed is 30 to 100 angstroms/min.

Alternatively, the amorphous silicon film 52 may be deposited by low pressure CVD (LPCVD) or plasma CVD. In the case of LPCVD, the deposition is carried out by introducing disilane (Si$_2$H$_6$) or trisilane (Si$_3$H$_8$) in a suitable CVD chamber. The pressure of the chamber is 30 to 300 Pa for example during deposition. The deposition temperature is selected at a temperature 100° C. to 200° C. lower than the recrystallization temperature of the glass substrate, i.e. 450° C. to 550° C., for example 530° C. The deposition speed is 50 to 250 angstroms/min. Boron may be introduced at $1\times 10^{15}$ cm$^{-3}$ to $1\times 10^{18}$ cm$^{-3}$ into the film by using diborane as a dopant gas together with the silane in order to make even the threshold voltages of N-type and P-type TFTs. In the case of plasma CVD, the deposition is carried out by introducing monosilane (SiH$_4$) or disilane (Si$_2$H$_6$) at 300° C. in a suitable plasma CVD chamber. The input energy is for example high frequency electric energy at 13.56 MHz.

After the substrate is coated with the silicon oxide film and the amorphous silicon semiconductor films, thermal treatment is given thereto at an intermediate temperature of 450° C. to 700° C., typically at 600° C. for 12 to 70 hours in a non-oxidizing atmosphere, e.g. in nitrogen or hydrogen. The film is recrystallized by this treatment (thermal annealing) in the form of semi-amorphous or semi-crystalline structure.

Since the amorphous silicon oxide film 51 underlies the silicon semiconductor film, there is no particular seed so that the semiconductor film is uniformly thermal annealed. Namely, the semiconductor is deposited in an amorphous phase in which hydrogen is simply mixed thereinto. By this annealing, the semiconductor film is partially recrystallized to form highly ordered regions. These regions have a tendency to convert their phase to more ordered phases (partial recrystallization). As a result, the peak of its Raman spectra (522 cm$^{-1}$: the peak of single crystalline silicon) is displaced to the low frequency direction. The apparent grain diameter calculated based on the half-width is 50 to 500 angstroms which seems to indicate existence of microcrystals. These regions appear in the form of a number of cluster.

The energy bands of the clusters are connected through the Si-Si bonds anchoring the clusters at the interfaces therebetween through which carriers can travel. For this reason, the polycrystalline (semi-amorphous or semi-crystalline) structure of silicon in accordance with the present invention is entirely different than usual polycrystals in which grain boundaries provide barriers against carrier transportation, so that the carrier mobility can be on the order of 15 to 300 cm$^2$/Vsec (electron mobility) and 10 to 200 cm$^2$/Vsec (hole mobility) which are higher than those of polycrystals. Namely, the semi-amorphous or semi-crystalline structure in accordance with the present invention is believed substantially not to include undesirable grain boundaries.

When the semiconductor film is annealed at a high temperature of 900° to 1200° C. rather than at the above intermediate temperature, the carrier mobility is significantly decreased by existence of impurities such as oxygen, carbon, nitrogen occurring due to segregation at grain boundaries by solid growth from seeds and therefore it is very difficult to obtain 10 cm$^2$/Vsec or higher mobilities.

The amorphous silicon semiconductor film is patterned by means of a photomask as indicated by ① to leave areas 52 which are necessary to form N-channel and P-channel transistors. After all the substrates are coated with the silicon oxide and amorphous silicon semiconductor films and patterned as described above, the entire structure is then coated with a silicon oxide film 54 of a thickness of 500 angstroms to 2000 angstroms, e.g. 1000 angstroms by sputtering in an oxide atmosphere as illustrated in FIG. 7(B). The deposition condition is same as that of the silicon oxide film 51 explained above. On the silicon oxide film 54 is deposited by low pressure CVD a silicon semiconductor film of 0.2 micrometer thickness which is highly doped with phosphorus at $1\times 10^{21}$ to $5\times 10^{21}$ cm$^{-3}$ followed, if desired, by coating a conductive film of 0.3 micrometers thickness made of molybdenum, tungsten, MoSi$_2$ or WSi$_2$. The semiconductor film coated with the conductive film is then patterned by photolithography with a suitable mask ② in order to form gate electrodes 19 and 9 to form channels of 10 micrometers length and 20 micrometers width.

Figure 7A:
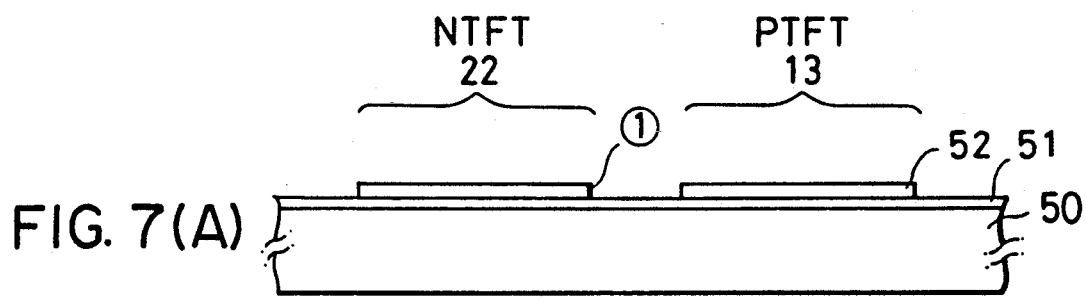
FIGS. 7(A) to 7(F) and FIG. 8 are cross sectional views showing a method of manufacturing complementary transistors in accordance with the second embodiment of the present invention.
Figure 7B:
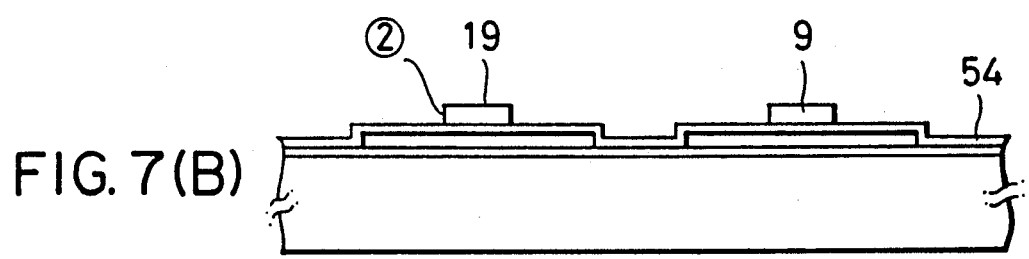
Figure 7C:
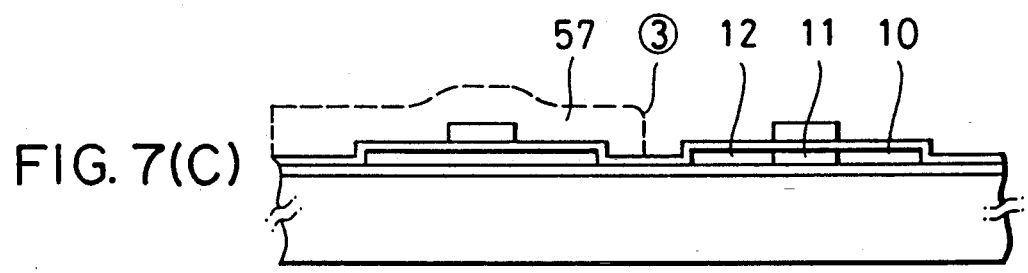
Figure 7D:
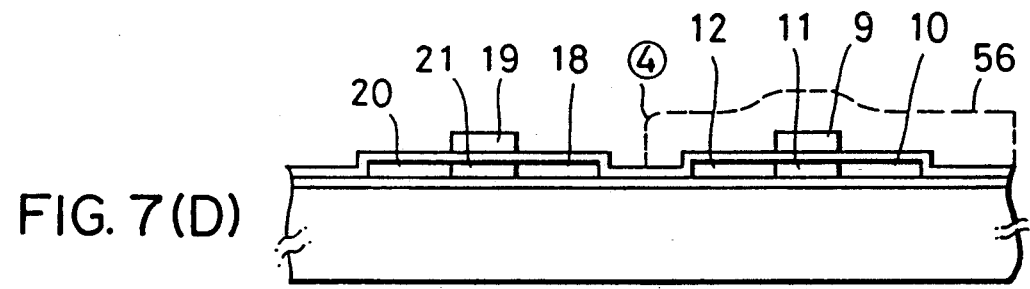
Figure 7E:
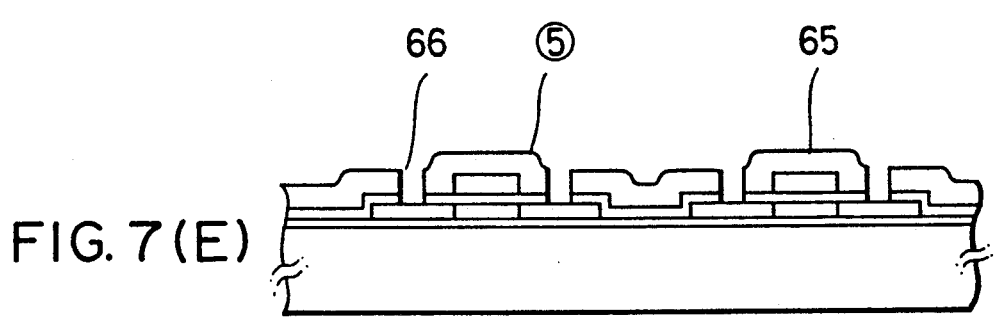

A photoresist film 57 is formed by the use of a photomask ③ in order to cover the left half of the illustrated structure (FIG. 7(C)). With the gate electrode 9 and the photoresist film 57, self-aligned impurity regions, i.e. a source and a drain region 10 and 12 are formed by ion implantation of boron at $1\times 10^{15}$ cm$^{-2}$ to $5\times 10^{15}$ cm$^{-2}$. The intermediate region 11 of the silicon semiconductor film 52 between the impurity regions 10 and 12 is then defined as a channel region of semi-amorphous silicon as illustrated in FIG. 7(C). After removing the photoresist film 57, another photoresist film 56 is formed by the use of a photomask ④ in order to cover the right half of the illustrated structure (FIG. 7(D)). With the gate electrode 19 and the photoresist film 56, self-aligned impurity regions, i.e. a source and a drain region 18 and 20 are formed by ion implantation of phosphorus at $1\times 10^{15}$ cm$^{-2}$ to $5\times 10^{15}$ cm$^{-2}$. The intermediate region 21 of the silicon semiconductor film between the impurity regions 18 and 20 is then defined as a channel region of semi-amorphous silicon semiconductor as illustrated in FIG. 7(D). The channel lengths of the p-channel and n-channel transistors are 10 micrometers respectively. The channel widths of the p-channel and n-channel transistors are 20 micormeters respectively. The ion implantation may instead be carried out by selectively removing the silicon oxide film 54 by the use of the gate electrode 9 or 19 as a mask followed by direct ion implantation of boron or phosphorus.

Optionally, the channel regions 11 and 21 of the transistors are doped with oxygen by ion implantation to $5\times 10^{20}$ cm$^{-3}$ to $5\times 10^{21}$ cm$^{-3}$. The oxygen implantation is employed for the purpose of avoiding undesirable influence of illumination upon the transistors due to the photoconductivity of the channel regions. If the transistors are formed only for the peripheral circuit which is not exposed to illumination rather than for directly driving the pixels, the oxygen implantation is not employed in order to maintain high speed operation of the peripheral circuit.

Figure 7F:
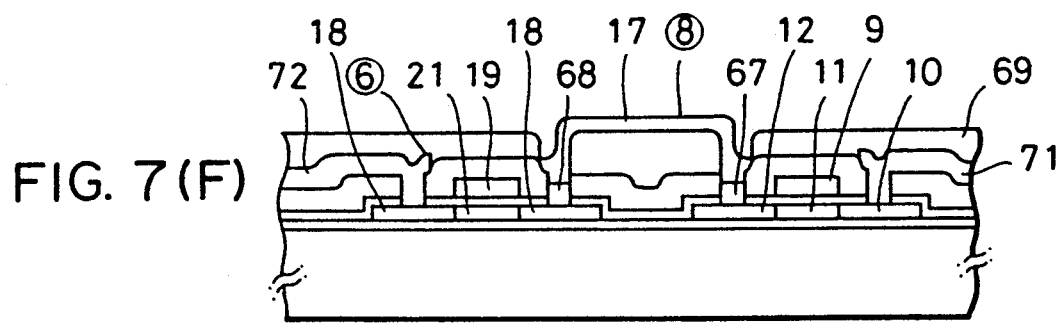

After removing photoresist 56, the entire structure is then heated at 600° C. for 10 to 50 hours in a H₂ atmosphere to make active the impurities in the regions 10, 12, 18 and 20 in order to form P+ and N+ drain and source regions with the semi-amorphous semiconductor channel regions 11 and 19 therebetween respectively. An interlayer insulating film 65 of silicon oxide is deposited to a thickness of 0.2 to 0.4 micrometers by the same sputtering method as described above over the entire surface of the structure followed by etching by means of a photomask ⑤ for opening contact holes 66 through the interlayer film 65 and the oxide film 54 in order to provide accesses to the underlying source and drain regions. The deposition of the interlayer insulating film 65 may instead be carried out by LPCVD, photo-CVD, ordinal pressure CVD(TEOS-ozone). Next, an aluminum film of 0.5 to 1 micrometers thickness is deposited on the structure over the contact holes 66 and patterned to form lead electrodes 71 and 72 and contacts 67 and 68 by means of a photomask ⑥ as illustrated in FIG. 7(F). After an organic resin film 69 such as a transparent polyimide resin film is coated in order to make flat the upper structure, contact holes are opened in the same manner by means of a photomask ⑦. A transparent conductive film such as an indium tin oxide film is deposited over the structure and patterned by means of a photomask ⑧ to provide lead electrode 17 to be electrically connected with the pad of a pixel. The ITO film is deposited by sputtering at room temperature to 150° C. followed by annealing in an oxidizing atmosphere (O₂) or in air at 200° to 400° C. The pad can be integrally formed at the same time by the deposition of the lead electrode 17. Then, the formation of CMOS transistors is finished. The mobility, the threshold voltage of the p-channel TFT are 20 cm²/Vs and −5.9 V. The mobility, the threshold voltage of the n-channel TFT are 40 cm²/Vs and +5V. The glass substrate is thus provided with these CMOS transistors and suitable conductive patterns as illustrated.

In the above embodiment, thermal annealing is carried out twice at the steps corresponding to FIGS. 7(A) and 7(D). The first annealing (FIG. 7(A)), however, can be omitted to shorten the process time.

Figure 8:
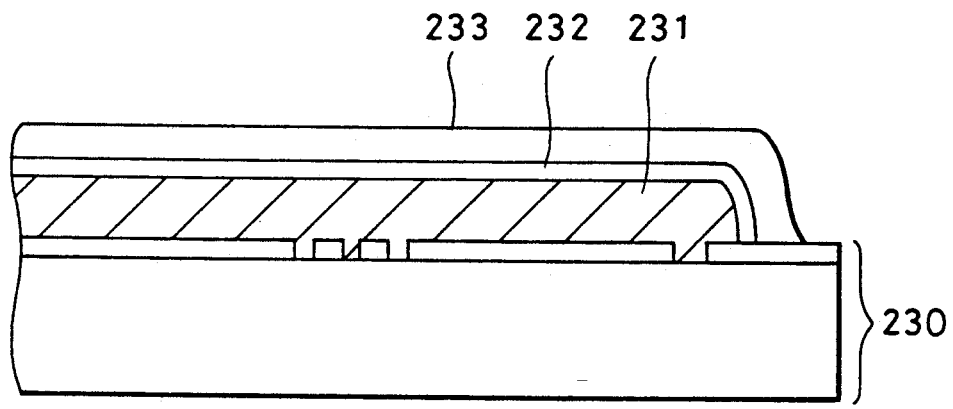

The following procedure is carried out in the same manner as the first embodiment. Explanation is made with reference to FIG. 8 wherein the structure illustrated in FIG. 7(F) is designated by numeral 230 with its details being omitted. Namely, a dispersion type liquid crystal material is prepared by mixing a nematic liquid crystal with a UV light curable epoxy modified acrylate resin. The proportion of the acrylate resin to the liquid crystal material is 50% in weight. The mixture is coated on the structure 230 over the transistors to a thickness of 15 micrometers by screen press printing with a screen having 125 meshes per inch. The pressure of a squeeze is 1.5 Kg/cm². After sufficiently leveling the coating by still leaving it for 10 minutes, the resin of the mixture is hardened by exposing the entirety of the coating to ultraviolet light having a central wave length of 236 nm emitted from a high pressure UV lamp. An electro-optical modulating layer 231 is then formed to a thickness of 12 micrometers as shown in the figure.

The upper surface of the layer 231 is coated with a Mo film by DC sputtering to a thickness of 2500 angstroms as a second electrode. Since the transistors are employed to drive the liquid crystal display, the second electrode does not have to be patterned so that the formation thereof is very simple. The entire surface of the structure is coated with a black epoxy resin by screen press printing. The black epoxy resin is prefired at 50° C. for 30 minutes and fired at 180° C. for 30 minutes in order to form a protective film 233 of 50 micrometers thickness. As a result, a light weight liquid crystal display panel of a reflective type is formed. The display is then connected with driving ICs mounted on a lead connector in the form of a TAB (tape-automated bonding).

Although a pair of complementary MOS transistors are connected to a conductive pad for each pixel in the above embodiments, two or more pairs of complementary transistors can be utilized, for each pixel, and connected to a conductive pad which in turn may comprises two or more divided parts each connected to one or more pairs of complementary transistors. Also, the transistors may be provided in other configurations than the complementary structure.

Figure 9:
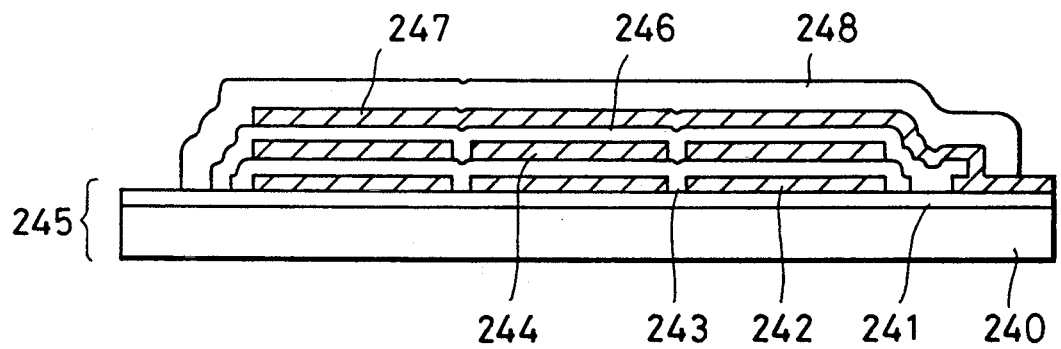
FIG. 9 is a schematic cross sectional view showing an electro-optical device manufactured in accordance with a third embodiment of the present invention.

Referring now to FIG. 9, a method of manufacturing an electro-optical device (a liquid crystal display) in accordance with a third embodiment of the present invention will be described. The display is provided with non-linear active elements having an MIM structure.

First, a silicon oxide film 241 is sputtered on an organic film 240 (e.g. a 0.7 mm thick polycarbonate film) to a thickness of 1000 to 3000 angstroms. An ITO film is then deposited on the oxide film 241 to a thickness of 1000 angstroms by DC sputtering and patterned in the form of parallel strips as first electrodes 242 by photolithography. The structure is disposed in a chamber and coated with a $Si_XC_Y$ film 243 (X+Y=1) of 1000 angstroms thickness by glow discharge. $C_2H_4$, $SiH_4$ and $H_2$ are introduced into the chamber at 2 SCCM, 1 SCCM and 10 SCCM respectively during the glow discharge as reactive gases. $PH_3$ is also introduced at a ratio in weight of $PH_3/SiH_4=0.05$. The reaction pressure is 50 Pa. The input power is radio frequency electric energy of 100 W.

The addition of $PH_3$ is employed for the purpose of controlling the conductivity of the film 243 and the non-linear characteristics. The addition of $PH_3$ is effective when the ratio in volume of $PH_3/(PH_3+SiH_4)$ is no higher than 0.3. The non-linear characteristics can be controlled also by thermal annealing which dehydrogenates and controls the hydrogen density of the thin film 243 corresponding to the insulator part of the MIM structure. For example, such thermal annealing is carried out at 380° C. and 100 Pa in Ar atmosphere for an hour.

Figure 10:
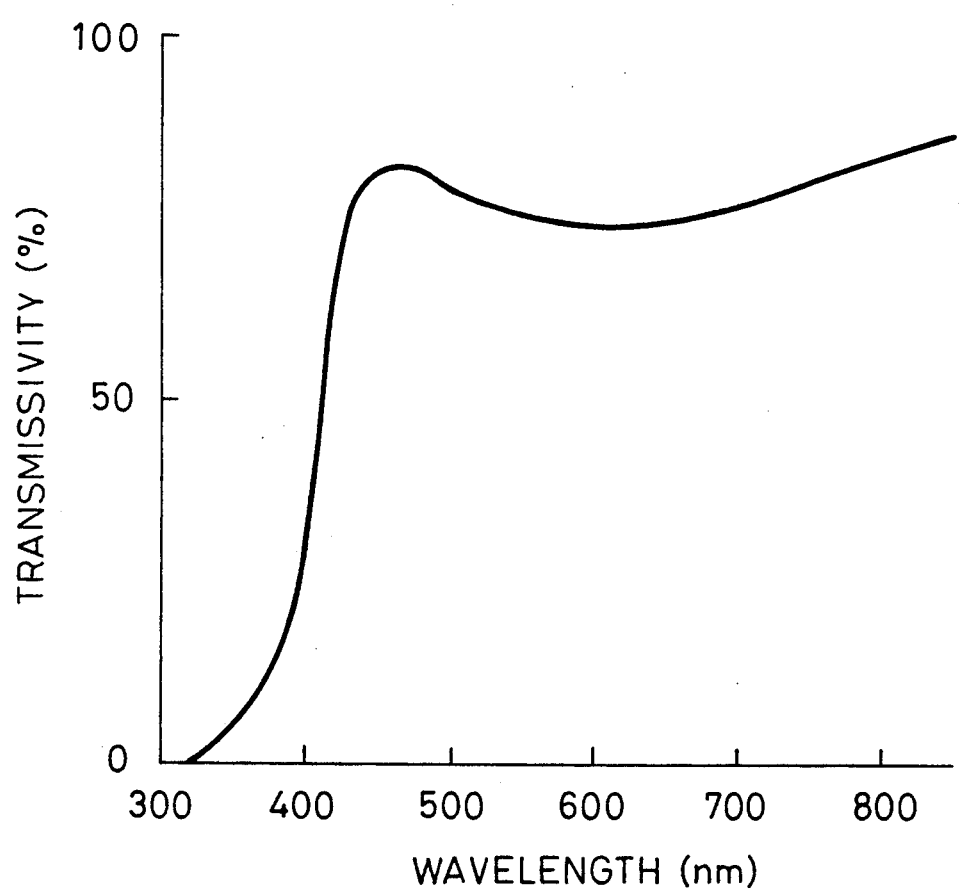
FIG. 10 is a graphical diagram showing the relationship between the transmissivity of a $Si_X C_Y (X+Y=1)$ and the wavelength incident thereon.

The thickness of the $Si_XC_Y$ film 243 is selected to be no larger than 2000 angstroms, preferably no larger than 1000 angstroms in order to maintain its transparency. The spectral transmission factor of a $Si_XC_Y$ film of 1000 angstrom thickness is shown in FIG. 10.

In prior arts, since the insulator part of a MIM structure is made of $Ta_2O_5$ or the like, its transparency becomes a problem so that its plan area has to be decreased. The $Si_XC_Y$ film 243 can be used without patterning to obtain a large aperture ratio because of its high transparency.

An ITO film of 1000 angstroms is then sputtered on the film 243 and patterned by photolithography to leave a plurality of second electrodes 244 in the form of square pads arranged in a matrix. The square pads are 240 micrometers × 240 micrometers pads arranged and spaced each other by 25 micrometers just above the first electrodes 242. The second electrodes correspond to pixels of the display and provided in order to make uniform an electric field applied to the thin film 243 at each pixel. The sputtering may be magnetron RF sputtering in this case.

Next, a UV light curable dispersion-type liquid crystal material is coated on the structure by spinning at 3500 rpm, leveled and exposed to UV light having a central wavelength of 236 nm emitted from a high pressure mercury lamp at an output power of 1000 mJ for 60 minutes in order to provide an electro-optical modulating layer 246. The liquid crystal material is prepared by dispersing a cholesteric liquid crystal in an epoxy modified acrylete resin at 60%. The thickness of the electro-optical modulating layer is 12 micrometers.

Then, an ITO film is coated again to the thickness of 1200 angstroms on the electro-optical modulating layer 246 and patterned in order to form third electrodes 247 extending in parallel to each other and in perpendicular to the first electrodes 242 in order that the intersections of the first and third electrodes correspond to the second electrodes, i.e. the pixels of the display.

The upper surface of the structure is coated with a protective film of 50 micrometers thickness by coating a silicon resin film by screen press printing. The silicon film is then pre-fired at 50° C. for 30 minutes and fired at 120° C. for 30 minutes. The structure is connected with driving ICs mounted on a lead connector in the form of a TAB. As a result, a reflective type liquid crystal display is formed.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. Examples are as follows:

Although the electro-optical modulating layer is coated by screen press printing, other existing methods can be employed appropriately depending upon the composition, the viscosity, the other characteristics of the dispersion-type liquid crystal material. The display can be formed on an engineering plastic, an organic resin film, a paper and the like which can support the thin film electrodes and the electro-optical modulating layer. The electro-optical device in accordance with the present invention may include two or more electro-optical modulating layers in one panel thereof. For example, the electro-optical device can be manufactured by forming a first electrode arrangement on a substrate, forming a first electro-optical modulating layer on the substrate over the first electrode arrangement, forming a second electrode arrangement on the first electro-optical modulating layer, forming a second electro-optical modulating layer on the second electrode arrangement, and forming a third electrode arrangement on the second electro-optical modulating layer.

What is claimed is:

1. A method of manufacturing electro-optical devices comprising:

forming non-linear semiconductor elements and a first electrode arrangement on a substrate;

coating an electro-optical modulating layer comprising a liquid crystal on said substrate over said non-linear semiconductor elements and first electrode arrangement;

forming a conductive layer on said electro-optical modulating layer; and patterning said conductive layer to form a second electrode arrangement.

2. The method of manufacturing electro-optical devices as claimed in claim 1 wherein said electro-optical modulating layer is prepared by dispersing said liquid crystal in a transparent organic resin.

3. The method of manufacturing electro-optical devices as claimed in claim 2 wherein said organic resin is a UV light curable resin.

4. The method of manufacturing electro-optical devices as claimed in claim 2 wherein said organic resin is a pre-polymer.

5. The method of manufacturing electro-optical devices as claimed in claim 4 further comprising a step of polymerizing said prepolymer.

6. The method of manufacturing electro-optical devices as claimed in claim 2 wherein said electro-optical modulating layer is prepared by dispersing said liquid crystal in a pre-polymer together with a polymerization initiator.

7. The method of manufacturing electro-optical devices as claimed in claim 6 further comprising a step of exposing said electro-optical modulating layer to UV light to initiate polymerization of said pre-polymer.

8. The method of manufacturing electro-optical devices as claimed in claim 1 further comprising a step of forming a protective film on said electro-optical modulating layer over said second electrode arrangement.

9. The method of manufacturing electro-optical devices as claimed in claim 8 wherein at least one of said substrate and said protective film is transparent.

10. The method of manufacturing electro-optical devices as claimed in claim 9 wherein said substrate comprises a material selected from the group consisting of an organic material and a glass.

11. The method of manufacturing electro-optical devices as claimed in claim 1 further comprising steps of:

forming another electro-optical modulating layer comprising a liquid crystal on said second electrode arrangement; and forming a third electrode arrangement on said another electro-optical modulating layer.

12. The method of claim 1 wherein said electro-optical modulating layer is coated by a method selected from the group consisting of screen press printing, offset printing, spinning, spraying, knife coating using a doctor knife, roll coating, and curtain coating.

13. The method of claim 1 wherein said non-linear elements are selected from the group consisting of a thin film transistor, complementary thin film transistor pair and a MIM element.

14. A method of manufacturing electro-optical devices comprising the steps of:

forming on a substrate an electric circuit comprising a switching element and a first electrode arrangement;

forming an electro-optical modulating layer comprising a liquid crystal on said electric circuit;

forming a transparent conductive oxide layer on said electro-optical modulating layer by sputtering; and patterning said conductive layer in order to form a second electrode arrangement.

15. The method of manufacturing electro-optical devices as claimed in claim 14 wherein said electro-optical modulating layer is prepared by dispersing said liquid crystal in a transparent organic resin.

16. The method of manufacturing electro-optical devices as claimed in claim 15 wherein said organic resin is a pre-polymer.

17. The method of manufacturing electro-optical devices as claimed in claim 16 further comprising a step of polymerizing said pre-polymer.

18. The method of manufacturing electro-optical devices as claimed in claim 15 wherein said electro-optical modulating layer is prepared by dispersing said liquid crystal in a pre-polymer together with a polymerization initiator.

19. The method of manufacturing electro-optical devices as claimed in claim 18 further comprising a step of exposing said electro-optical modulating layer to UV light to initiate polymerization of said pre-polymer.

20. The method of manufacturing electro-optical devices as claimed in claim 14 wherein said switching element comprises a thin film transistor.

21. The method of manufacturing electro-optical devices as claimed in claim 14 further comprising a step of forming a protective film on said electro-optical modulating layer over said second electrode arrangement.

22. The method of manufacturing electro-optical devices as claimed in claim 14 further comprising steps of:

forming another electro-optical modulating layer comprising a liquid crystal on said second electrode arrangement; and forming a third electrode arrangement on said another electro-optical modulating layer.

23. The method of claim 14 wherein said electro-optical modulating layer is coated by a method selected from the group consisting of screen press printing, offset printing, spinning, spraying, knife coating using a doctor knife, roll coating, and curtain coating.

24. The method of claim 14 wherein said non-linear elements are selected from the group consisting of a thin film transistor, complementary thin film transistor pair and a MIM element.

25. The method of claim 14 further comprising annealing said transparent conductive oxide layer in an oxidizing atmosphere.

26. A method for forming an electro-optical device comprising the steps of:

forming an electrode arrangement and active elements in the form of a matrix on a substrate;

applying an electro-optical modulating layer comprising a mixture of a liquid crystal and an organic transparent material on said substrate;

forming a second electrode layer on said electro-optical modulating layer;

patterning said second electrode layer to form a second electrode arrangement; and forming a protective coating directly on said second electrode arrangement.

27. The method of claim 26 wherein said protective coating comprises a silicon resin.

28. A method for forming an electro-optical device comprising the steps of:

forming an electrode arrangement and active elements in the form of a matrix on a substrate;

applying an electro-optical modulating layer comprising a mixture of a liquid crystal and an organic transparent material on said substrate;

forming a second electrode layer on said electro-optical modulating layer; and patterning said second electrode layer to form a second electrode arrangement;

wherein said active elements comprises metal-insulator-metal elements where the insulator comprises $Si_xC_y(x+y=1)$.

29. The method of claim 28 wherein said insulator is not thicker than 2000 Å.

* * * * *